United States Patent [19]

Hutter et al.

[11] 4,299,634

[45] Nov. 10, 1981

[54] PROCESS FOR THE PREPARATION OF RAW MIX FOR THE PRODUCTION OF CEMENT AND SULPHURIC ACID

[75] Inventors: Josef Hutter, Dornach; Heinz Göller, Linz, both of Austria

[73] Assignee: Chemie Linz Aktiengesellschaft, Austria

[21] Appl. No.: 199,219

[22] Filed: Oct. 21, 1980

[30] Foreign Application Priority Data

Oct. 26, 1979 [DE] Fed. Rep. of Germany ....... 2943429

[51] Int. Cl.$^3$ .............................................. C04B 7/04
[52] U.S. Cl. ................................. 106/103; 423/541 R
[58] Field of Search ................ 106/103; 423/522, 530, 423/541 R, 542

[56] References Cited

U.S. PATENT DOCUMENTS

4,040,853  8/1977  Binder et al. ..................... 106/103

FOREIGN PATENT DOCUMENTS

1671215  9/1971  Fed. Rep. of Germany ...... 106/103

*Primary Examiner*—James Poer
*Attorney, Agent, or Firm*—Wenderoth, Lind & Ponack

[57] ABSTRACT

Preparation of a raw mix for use in the production of cement and sulphuric acid by the cement-sulphuric acid process, wherein coke is comminuted to a degree that at most 10% by weight of the coke has a particle size of less than 0.1 mm and at least 90% by weight has a particle size of less than 20 mm, but at least 60% by weight has a particle size greater than 0.2 mm, after which the thus comminuted coke is mixed with a mixture, of fine particle size, comprising calcium sulphate and the remaining additives.

10 Claims, No Drawings

PROCESS FOR THE PREPARATION OF RAW MIX FOR THE PRODUCTION OF CEMENT AND SULPHURIC ACID

The present invention relates to the preparation of raw mix for the production of cement and sulphuric acid by the so-called gypsum-sulphuric acid process or cement-sulphuric acid process. In the so-called gypsum-sulphuric acid process, cement clinker and sulphur dioxide or sulphuric acid are produced from gypsum (often waste gypsum) by reaction with coke and additives containing $SiO_2$, $Al_2O_3$ and $Fe_2O_3$. The process is carried out in the known rotary kilns, which, for more economical preheating of the raw mix, consisting of the calcium sulphate component, the coke and the additives containing $SiO_2$, $Al_2O_3$ and $Fe_2O_3$, can be preceded by a suspension-type heat exchanger.

At the reaction temperatures, which are known to be high, the reaction in the various zones of the rotary kiln and, where relevant, in a preceding suspension-type heat exchanger, takes place essentially as follows:

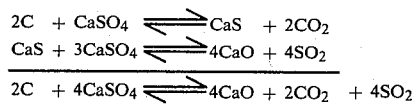

and furthermore CO is also formed in accordance with the equation $C + CO_2 \rightleftarrows CO$, and participates in the reaction.

The CaO formed then reacts, in the sintering zone of the rotary kiln, with the additives to give cement clinker, whilst the $SO_2$ together with the waste gases in fed, where appropriate via the suspension-type heat exchanger and via appropriate purification stages, to the sulphuric acid installation.

Hitherto, the view was held that the raw mix had to be finely ground both before being employed directly in the rotary kiln and if a preceding suspension-type heat exchanger was used, and that the individual components required to have, from the start, an appropriately small particle size (see German Offenlegungsschrift No. 1,671,215). However, a somewhat coarser particle size distribution of the coke has already been described in U.S. Pat. No. 4,040,853, in which it is proposed that the coke, instead of being ground, as customary up to that time, to about
- 55-75% by weight <0.06 mm
- 15-25% by weight 0.06-0.09 mm
- 10-20% by weight 0.09-0.20 mm should instead be gound to
- 25-40% by weight <0.06 mm
- 8-15% by weight 0.06-0.09 mm
- 45-70% by weight >0.09 mm On evaluating this product by means of the Rosin-Rammler particle size screen, it is found that the proportion of this coke in the form of particles larger than 0.2 mm can be at most 60% by weight. To exceed this figure has hitherto been regarded as unacceptable.

Surprisingly, it has now been found that in the gypsum-sulphuric acid process, including the case where a preceding suspension-type heat exchanger is used, it is possible to employ the coke at a particle size which is far outside the grinding fineness hitherto described, namely with particle size essentially between 0.2 and 20 mm, without adversely effecting the $C:SO_3$ ratio. The rotary kiln, or the burning installations consisting of the rotary kiln and the preheater, can under these circumstances not only be run in the usual manner without any disadvantages regarding the cement clinker produced or the sulphuric acid obtained; rather, not insignificant improvements in quality of the resulting cement can be observed.

Accordingly, the invention relates to a process for the preparation of a raw mix suitable for use in the production of cement and sulphuric acid by the cement-sulphuric acid process, the improvement comprising comminuting coke to a degree that at most 10% by weight of the coke has a particle size of less than 0.1 mm and at least 90% by weight has a particle size of less than 20 mm, with the proviso that at least 60% by weight has a particle size greater than 0.2 mm, after which the thus comminuted coke is mixed with a mixture, of fine particle size, comprising calcium sulphate and the remaining additives. Preferably, the particle size is predominantly from 1 to 5 mm, and in particular it is advantageous if at most 40% by weight of the coke component has a particle size of less than 1 mm and at least 70% by weight has a particle size of less than 5 mm, so that, accordingly, at least 30% by weight lies in the particle size range of 1-5 mm. It is particularly preferred to grind the coke to a particle size spectrum according to which at least 60% by weight has a particle size of between 10 and 20 mm. In such cokes, the particle fractions of smaller size can even be kept at extremely low levels. The production of coke having such a relatively uniform particle size can be effected in so-called crushers, for example a roll crusher, which entails substantially less expense than the previously customary fine grinding.

The suitability of such a coarse coke for the cement-sulphuric acid process, especially when using a suspension-type heat exchanger, was unobvious, for the following reasons:

On the one hand, according to the types of reaction mentioned above, a reaction between solid bodies can only take place in an optimum manner if the reactants are of sufficiently fine particle size and have been homogeneously mixed with one another, which is necessarily not the case when using the coarse coke according to the invention. However, even if it is assumed that the reaction involved is not between solids but that a part of the reducing agent is gaseous (such as, for example, the CO from $C + CO_2$), it would be necessary to hold the view that only homogeneous mixing with the other components, resulting from appropriately fine particle size, would ensure that the reaction would take place, without disturbing factors, in the direction of producing cement clinker conforming to specification, and of giving an optimum yield of sulphur dioxide. A less homogeneous mixture of the components, resulting from the coarseness of the coke according to the invention, should lead to a local excessive availability of CO, which escapes, unutilised, from the reaction mixture, whilst at other points there is a CO deficiency, which interferes with the proper course of the reaction. Surprisingly, this prejudice has proved to be incorrect. One of the advantages of the process according to the invention is that commercially available coke breeze, such as is present, for example, as waste on coke tips, can be employed without additional comminution. Accordingly, in this case the expensive grinding of coke and, where fine waste gypsum, and fly ash as additive, are employed, any grinding whatsoever of the starting material is avoided, thereby achieving a substantial saving in energy.

As regards an upper limit of particle size, it is above all mechanical aspects which have to be considered, such as the danger of erosion damage, especially if a preheater is used. For these reasons it is advisable, above all in the latter case, not to exceed substantially a particle size of 20 mm.

When using the raw mix produced according to the invention in the gypsum-sulphuric acid process, it is possible to maintain, in the rotary kiln, both the customary C:SO$_3$ ratio and the customary burning conditions, such as temperatures, for example a temperature of 1,400°–1,450° C. If an installation having a preceding suspension-type heat exchanger is used, the temperature in the latter is advantageously kept at about 800° C. and the oxygen content in the gas atmosphere of the heat exchanger is advantageously kept at 0.6 to 2.0% by volume.

However, as a result of the reduced content of fines in the mix in the kiln, there is the advantage that the circulation of dust between the rotary kiln and the preheater or the subsequent dedusting installations is less, as a result of which the productivity of a given installation is increased.

The coarseness of the coke according to the invention also causes the material flow in the rotary kiln to be more uniform. This facilitates maintaining optimum burning conditions and even leads to an improvement in the clinker quality.

The examples which follow are intended to explain the process according to the invention in more detail.

EXAMPLE 1

A mix for charging into the kiln is prepared from 79.5% of waste gypsum from phosphoric acid production, 15.9% of fly ash as a source of SiO$_2$, Al$_2$O$_3$ and Fe$_2$O, and 4.6% of coke breeze. The coke breeze has the following particle size distibution:

| | |
|---|---|
| <0.1 mm | 8.7% |
| 0.1–0.2 mm | 8.8% |
| 0.2–0.5 mm | 20.8% |
| 0.5–1 mm | 30.6% |
| 1–3 mm | 24.9% |
| 3–10 mm | 6.2% |

This mix is converted to cement clinker and SO$_2$ in a gypsum-sulphuric acid installation, comprising a rotary kiln and a suspension-type heat exchanger, at temperatures of up to about 800° C. in the suspension-type heat exchanger and temperatures of 800° to 1,450° C. in the various zones of the subsequent rotary kiln.

Portland cement is produced from the resulting clinker by grinding with 3% of gypsum.

The productivity of the rotary kiln, when using the abovementioned coke breeze, is 258 tonnes per day, and the so-called 1-day compressive strength (ÖNORM (Austrian Standard Specification) B 3310) is 12.8 N/mm$^2$, whilst if a coke, finely ground in the usual manner, is employed under completely analogous conditions, 250 tonnes of clinker per day are produced and the 1-day compressive strength is 11.9 N/mm.

EXAMPLE 2

A mix for charging into the kiln, consisting of 79.5% of waste gypsum from phosphoric acid production, 15.9% of fly ash as a source of SiO$_2$, Al$_2$O$_3$ and Fe$_2$O$_3$ and 4.6% of coke breeze is produced, the coke breeze having the following particle size distribution:

| | |
|---|---|
| <0.1 mm | 4% |
| 0.1–0.2 mm | 5% |
| 0.2–0.5 mm | 7% |
| 0.5–1 mm | 20% |
| 1–3 mm | 22% |
| 3–5 mm | 19% |
| 5–10 mm | 18% |
| >10 mm | 5% |

This mix is converted to cement clinker and SO$_2$ in a gypsum-sulphuric acid installation, comprising a rotary kiln and a suspension-type heat exchanger, at temperature of up to about 800° C. in the suspension-type heat exchanger and temperatures of 800° C. to 1,450° C. in the various zones of the subsequent rotary kiln.

Portland cement is produced from the resulting clinker by grinding with 3% of gypsum.

The productivity of the rotary kiln, when using the abovementioned coke breeze, is 260 tonnes per day, and the so-called 1-day compressive strength (ÖNORM (Austrian Standard Specification) B 3310) is 13.5 N/mm$^2$, whilst if a coke, finely ground in the usual manner, is employed under completely analogous conditions, 250 tonnes of clinker per day are produced and the 1-day compressive strength is 11.9 N/mm$^2$.

EXAMPLE 3

A mix for charging into the kiln, consisting of 80.5% of waste gypsum from phosphoric acid production, 15.0% of fly ash and 4.5% of coke breeze, is converted to cement clinker and SO$_2$ gas.

The coke breeze employed has the following particle size distribution:

| | |
|---|---|
| <0.5 mm | 1% |
| 0.5–1 mm | 2% |
| 1–3 mm | 4% |
| 3–5 mm | 13% |
| 5–10 mm | 20% |
| 10–20 mm | 60% |

This mix is converted to cement clinker and SO$_2$ gas in the same gypsum-sulphuric acid installation and under the same conditions as in Example 1.

Portland cement is produced from the resulting clinker by grinding with 3% of gypsum.

The productivity of the rotary kiln was 262 tonnes per day and the 1-day compressive strength, determined according to ÖNORM (Austrian Standard Specification) B 3310 was 14.2 N/mm$^2$, whilst when using a finely ground coke under completely analogous conditions 250 tonnes of clinker per day are produced and the 1-day compressive strength is 11.9 N/mm$^2$.

What we claim is:

1. In a process for the preparation of a raw mix suitable for use in the production of cement and sulphuric acid by the cement-sulphuric acid process the improvement comprising comminuting coke to a degree that at most 10% by weight of the coke has a particle size of less than 0.1 mm and at least 90% by weight has a particle size of less than 20 mm, with the proviso that at least 60% by weight has a particle size greater than 0.2 mm, after which the thus comminuted coke is mixed with a mixture, of fine particle size, comprising calcium sulphate and the remaining additives.

2. A process according to claim 1, in which the coke is comminuted to a degree of comminution such that at most 40% by weight of the coke has a particle size of less than 1 mm and at least 70% by weight has a particle size of less than 5 mm.

3. A process according to claim 1, in which the coke is comminuted to a degree of comminution such that at least 60% by weight thereof has a particle size of between 10 and 20 mm.

4. In a process for the production of sulphuric acid and cement by the cement sulphuric acid process, which comprises using a raw mix comprising calcium sulphate, coke and other additives and heating it at 1,400° to 1,450° C. in a rotary kiln to obtain cement clinker and sulfurdioxide, the improvement wherein the coke component of the raw mix has a particle size spectrum such that at most 10% by weight has a particle size of less than 0.1 mm and at least 90% by weight has a particle size of less than 20 mm, with the proviso that at least 60% by weight has a particle size of more than 0.2 mm.

5. A process according to claim 4 in which the coke component of the raw mix has a particle size spectrum such that at most 40% by weight has a particle size of less than 1 mm and at least 70% by weight has a particles size of less than 5 mm.

6. A process according to claim 4 in which the coke component of the raw mix has a particle size spectrum such that at least 60% by weight of the coke has a particle size of between 10 and 20 mm.

7. A process according to claim 4 in which the raw mix is preheated by a suspension-type heat exchanger which is connected with the rotary kiln, before being fed into said kiln, the gaseous atmosphere of said heat exchanger having an oxygen content of 0.6 to 2.0 Vol%.

8. A composition which comprises ground calcium sulphate and coke, having a particle size spectrum such that at most 10% by weight has a particle size of less than 0.1 mm and at least 90% by weight has a particle size of less than 20 mm, with the proviso that at least 60% by weight has a particle size of more than 0.2 mm.

9. A composition according to claim 8, in which the coke has a particle size spectrum such that at most 40% by weight has a particle size of less than 1 mm and at least 70% by weight has a particle size of less than 5 mm.

10. A composition according to claim 8, in which the coke has a particle size spectrum in which at least 60% by weight has a particle size of between 10 and 20 mm.

* * * * *